(12) United States Patent
Schmitt

(10) Patent No.: US 7,624,757 B2
(45) Date of Patent: Dec. 1, 2009

(54) DUAL FUNCTION HANDLES FOR A FAUCET ASSEMBLY

(75) Inventor: Randall Paul Schmitt, Clinton Township, MI (US)

(73) Assignee: Masco Corporation of Indiana, Indianapolis, IN (US)

( * ) Notice: Subject to any disclaimer, the term of this patent is extended or adjusted under 35 U.S.C. 154(b) by 590 days.

(21) Appl. No.: 11/558,188

(22) Filed: Nov. 9, 2006

(65) Prior Publication Data
US 2008/0111090 A1    May 15, 2008

(51) Int. Cl.
G05D 23/13 (2006.01)
F16K 11/22 (2006.01)

(52) U.S. Cl. .......... 137/606; 137/801; 236/12.12; 236/12.15; 251/129.03

(58) Field of Classification Search .......... 251/129.03, 251/129.04, 129.11; 236/12.1, 12.11, 12.12, 236/12.15; 137/606, 801
See application file for complete search history.

(56) References Cited

U.S. PATENT DOCUMENTS

| | | | |
|---|---|---|---|
| 4,359,186 A | 11/1982 | Kiendl | |
| 4,399,836 A | 8/1983 | de Versterre et al. | |
| 4,406,398 A | 9/1983 | Perkins | |
| 4,420,811 A | 12/1983 | Tarnay et al. | |
| 4,439,654 A | 3/1984 | Bresin et al. | |
| 4,682,728 A | 7/1987 | Oudenhoven et al. | |
| 4,688,273 A | 8/1987 | Lyng | |
| 4,688,277 A | 8/1987 | Kakinoki et al. | |
| 4,711,392 A | 12/1987 | Kidouchi et al. | |
| 4,842,191 A | 6/1989 | Bergmann | |
| 4,854,498 A | 8/1989 | Stayton | |
| 4,869,287 A | 9/1989 | Pepper et al. | |
| 4,888,834 A | 12/1989 | Vago | |
| 4,931,938 A | 6/1990 | Hass | |
| 4,969,598 A | 11/1990 | Garris | |
| 4,981,156 A | 1/1991 | Nicklas et al. | |
| 5,050,062 A | 9/1991 | Hass | |
| 5,092,560 A | 3/1992 | Chen | |
| 5,123,593 A | 6/1992 | Rundle | |
| 5,318,070 A * | 6/1994 | Surabian .................. 137/606 |
| 5,358,177 A * | 10/1994 | Cashmore .................. 137/606 |
| 5,358,213 A | 10/1994 | Pilolla | |
| 5,397,099 A | 3/1995 | Pilolla | |
| 5,417,404 A | 5/1995 | Varden | |
| 5,504,950 A | 4/1996 | Natalizia et al. | |
| 5,755,262 A | 5/1998 | Pilolla | |
| 5,868,311 A | 2/1999 | Cretu-Petra | |

(Continued)

FOREIGN PATENT DOCUMENTS

DE    3430 176 A1    3/1985

(Continued)

*Primary Examiner*—John Bastianelli
(74) *Attorney, Agent, or Firm*—Baker & Daniels LLP (57) ABSTRACT

A faucet assembly is operable automatically or mechanically to facilitate control in a non-powered or motor failure condition. In the automatic control position, separate and automatic control of fluid flow and temperature is provided by respective actuation of first and second handles. In the manual control position, the first and second handles are moved axially to decouple electric motors from corresponding fluid control valves. Such axial movement of the first and second handles concurrently couples the handles mechanically to the corresponding fluid control valves to provide the desired manual actuation.

17 Claims, 7 Drawing Sheets

U.S. PATENT DOCUMENTS

| | | | |
|---|---|---|---|
| 5,879,559 A | 3/1999 | Schreiner et al. | |
| 5,944,255 A | 8/1999 | Shirmohamadi | |
| 5,979,776 A * | 11/1999 | Williams | 236/12.15 |
| 6,003,170 A | 12/1999 | Humpert et al. | |
| 6,029,094 A * | 2/2000 | Diffut | 236/12.12 |
| 6,056,201 A | 5/2000 | Ta | |
| 6,341,389 B2 | 1/2002 | Philipps-Liebich et al. | |
| 6,341,731 B1 | 1/2002 | Knapp | |
| 6,351,603 B2 | 2/2002 | Waithe et al. | |
| 6,446,875 B1 | 9/2002 | Brooks et al. | |
| 6,481,634 B1 * | 11/2002 | Zosimadis | 236/12.12 |
| 6,676,024 B1 | 1/2004 | McNerney et al. | |
| 6,705,534 B1 | 3/2004 | Mueller | |
| 6,758,242 B2 | 7/2004 | Jones et al. | |
| 6,874,535 B2 * | 4/2005 | Parsons et al. | 251/129.03 |
| 6,879,863 B2 | 4/2005 | Mueller et al. | |
| 6,883,541 B2 | 4/2005 | Hwang | |
| 6,929,187 B2 * | 8/2005 | Kempf et al. | 236/12.11 |
| 6,962,168 B2 | 11/2005 | McDaniel et al. | |
| 7,014,166 B1 * | 3/2006 | Wang | 251/129.03 |
| 7,150,293 B2 * | 12/2006 | Jonte | 137/801 |
| 2006/0231636 A1 | 10/2006 | Schmitt | |
| 2006/0231637 A1 | 10/2006 | Schmitt | |
| 2006/0231638 A1 | 10/2006 | Belz et al. | |
| 2007/0001018 A1 | 1/2007 | Schmitt et al. | |

FOREIGN PATENT DOCUMENTS

| | | |
|---|---|---|
| DE | 3407 796 A1 | 9/1985 |
| GB | 2 143 343 | 2/1985 |
| GB | 2 270 858 | 3/1994 |

\* cited by examiner

DUAL FUNCTION HANDLES FOR A FAUCET ASSEMBLY

BACKGROUND OF THE INVENTION

The present invention relates to a faucet assembly with automatic controls. More specifically, this invention relates to faucet assembly that includes both automatic and manual control of fluid flow and temperature.

Faucets for tubs typically include separate knobs or handles to control the flow of hot and cold water. The separate hot and cold handles are adjusted to provide the desired flow and temperature of water. It is known to provide a faucet with an automated feature for regulating the flow and temperature of water without constant adjustment by a user. In this way temperature fluctuations are compensated for automatically without additional input from a user.

These automated faucets typically utilize electric motors to drive valves that adjust water flow and temperature. During power outages or motor failures, the automated controls for these faucets do not operate.

Accordingly, it is desirable to design and develop an automated fluid delivery device that provides both automatic control and mechanical control of fluid flow and temperature.

SUMMARY OF THE INVENTION

An illustrative faucet assembly is operable both automatically and mechanically to facilitate control in a non-powered or motor failure condition.

The illustrative faucet assembly includes a spout, a first handle and a second handle. The first handle controls a first power module, and the second handle controls a second power module. The first power module includes a first fluid control valve and the second power module includes a second fluid control valve.

In an automatic control position, separate and automatic control of fluid flow and temperature is provided by actuation of the first and second handles. In the illustrative faucet assembly, the first handle provides the input utilized to set a desired fluid flow rate and the second handle provides the input utilized to set a desired fluid temperature. Operation of the first handle to control fluid flow provides an input that results in actuation of electric motors in each of the power modules. Similarly, operation of the second handle to control fluid temperature provides an input that results in selective operation of electric motors in each power module to supply a mixture of hot and cold water that provides the desired temperature of fluid output from the spout.

In a manual control position, the first and second handles are pulled outwardly or upwardly to decouple the electric motors from the respective fluid control valves. A stem gear is then coupled to operate the fluid control valve of each power module to provide manual actuation and adjustment.

Accordingly, in the absence of electrical power or in the event of motor failure, the illustrative electrically controlled faucet remains operable to provide the desired temperature and flow of water.

Additional features and advantages of the present invention will become apparent to those skilled in the art upon consideration of the following detailed description of the illustrative embodiment exemplifying the best mode of carrying out the invention as presently perceived.

DETAILED DESCRIPTION OF A PREFERRED EMBODIMENT

Figure 1:
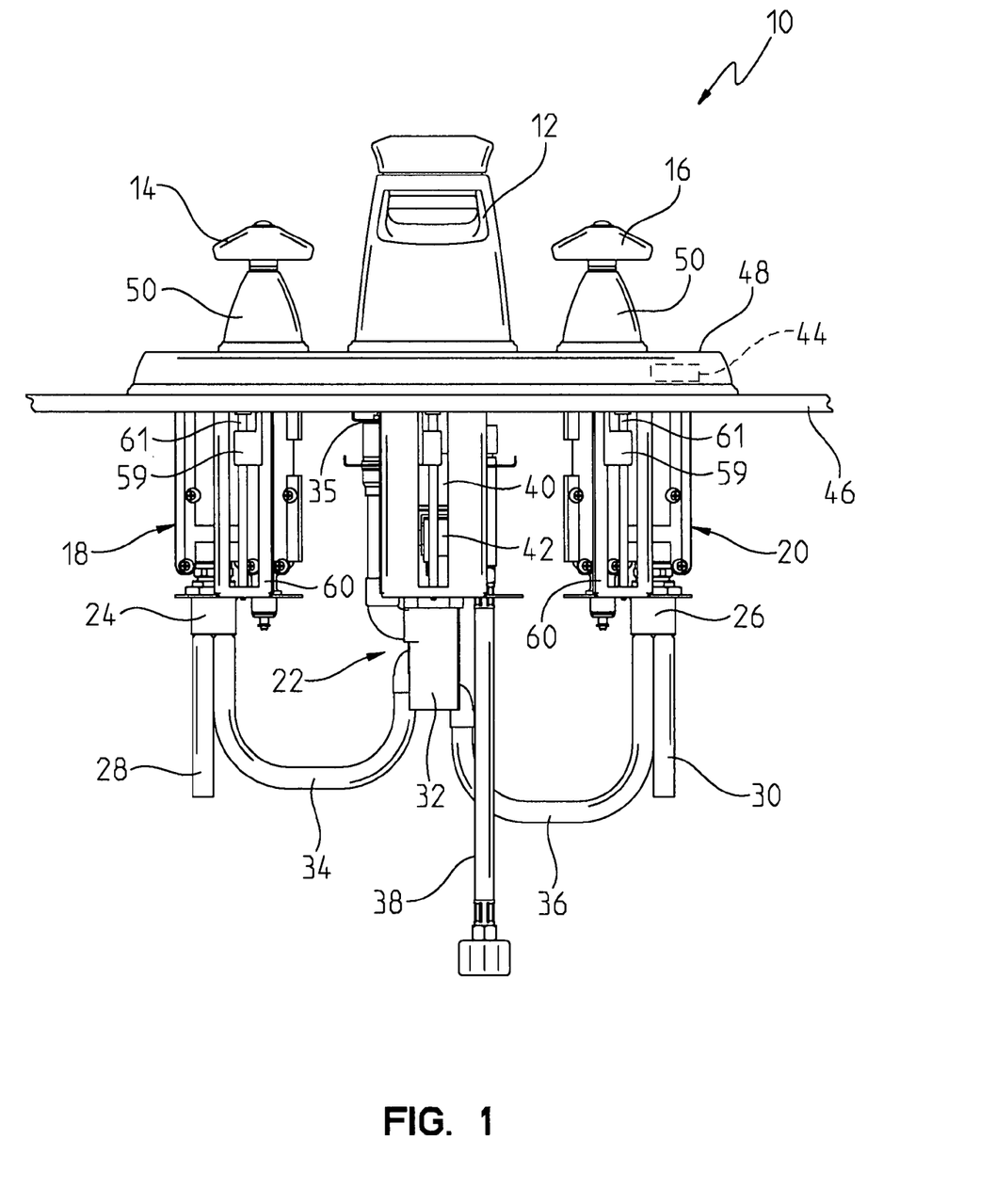
FIG. 1 is a front view of an illustrative faucet assembly that is operable both automatically and manually.

Referring to FIG. 1, an illustrative faucet assembly 10 includes a spout 12, a first control member, illustratively a knob or handle 14, and a second control member, illustratively a knob or handle 16. The first handle 14 controls a first power, or control module 18, and the second handle 16 controls a second power, or control module 20. The first power module 18 includes a first fluid control valve 24 and the second power module 20 includes a second fluid control valve 26. The first fluid control valve 24 controls water flow from a hot water inlet 28 to an outlet 34. The second fluid control valve 26 controls water flow from a cold water inlet 30 to an outlet 36. It should be appreciated that the hot water inlet 28 and the cold water inlet 30 may be reversed based on installation and controller programming.

The outlets 34 and 36 feed water to a mixing module 22. The mixing module 22 includes a mixing valve 32 that provides for substantially uniform mixing of hot and cold fluids. The mixing valve 32 may be similar in functionality to the mixer detailed in U.S. patent application Ser. No. 11/109,283, filed Apr. 19, 2005, which is expressly incorporated by reference herein. A temperature sensor 35 is illustratively disposed within the mixing module 22 to obtain information indicative of fluid temperature passing therethrough to the spout 12. The mixing module 22 further illustratively includes a flow triggered diverter valve 40, and a solenoid valve 42 that operates to direct water through an outlet hose 38 to a hand shower or sprayer device (not shown).

The illustrative faucet assembly 10 is mounted on a deck 46 and includes a controller 44 which may be housed within a cover or escutcheon 48. It should be appreciated that the controller 44 may be positioned at other locations, including below the deck 46. Each handle 14, 16 is supported above the deck 46 by a respective handle support 50. Mounting frames 60 extend downwardly from the deck 46 and support the power modules 18 and 20. An adjustable clamp 59 is supported for movement along a threaded post 61 for coupling each mounting frame 60 to the deck 46. Since the clamp 59 is adjustable, the mounting frame 60 may be coupled to decks 46 having varying thicknesses.

The controller 44 is programmed to provide instructions to each of the power modules 18, 20 for controlling fluid flow rate and temperature, and to the solenoid valve 42 for controlling or directing flow between the spout 12 and the outlet hose 38 of the hand sprayer device. More particularly, in the automatic control position, the controller 44 receives inputs from rotation of the handles 14 and 16 to establish set fluid flow rate and temperature, respectively.

The controller 44 also illustratively receives input from temperature sensor 35 indicative of the outlet or mixed water temperature, thereby providing control feedback for maintaining the set fluid temperature through control of power modules 18, 20. The temperature sensor 35 may also be utilized to provide for scald protection, wherein the first fluid control valve 24, and in certain embodiments also the second fluid control valve 26, are closed by respective motors 66 (FIG. 2) when a predetermined temperature is exceeded. A flow sensor (not shown) may also be in communication with the controller 44 for providing control feedback for maintaining the set fluid flow rate. The power modules 18 and 20 are selectively operable in an automatic (or electric) control mode or position, and a manual control mode or position. The illustrative first power module 18 and the second power module 20 operate in a similar manner.

Operation of the faucet assembly 10 in the automatic control position provides for separate and automatic control of fluid flow and temperature. The first handle 14 provides the input to the controller 44 utilized to set a desired fluid flow rate. The second handle 16 provides the input to the controller 44 utilized to set a desired fluid temperature. It should be appreciated that the first handle 14 and the second handle 16 could be reversed, such that the first handle 14 is utilized to control fluid temperature and the second handle 16 is utilized to control fluid flow rate. The controller 44 receives inputs from both the first and second handles 14 and 16 and translates those inputs into the appropriate actuation of electric motors 66 and respective valves 24 and 26 (FIGS. 2-4) within each of the power modules 18 and 20. Operation of the first handle 14 to control fluid flow thereby provides an input to the controller 44 that results in actuation of the electric motors 66 in each of the power modules 18 and 20, such that the set or desired flow rate is achieved. Similarly, operation of the second handle 16 to control fluid temperature provides the input to the controller 44 that results in selective operation of electric motors 66 in each power module 18 and 20 to supply a mixture of hot and cold water that provides the set or desired temperature of fluid output from the spout 12.

Figure 2:
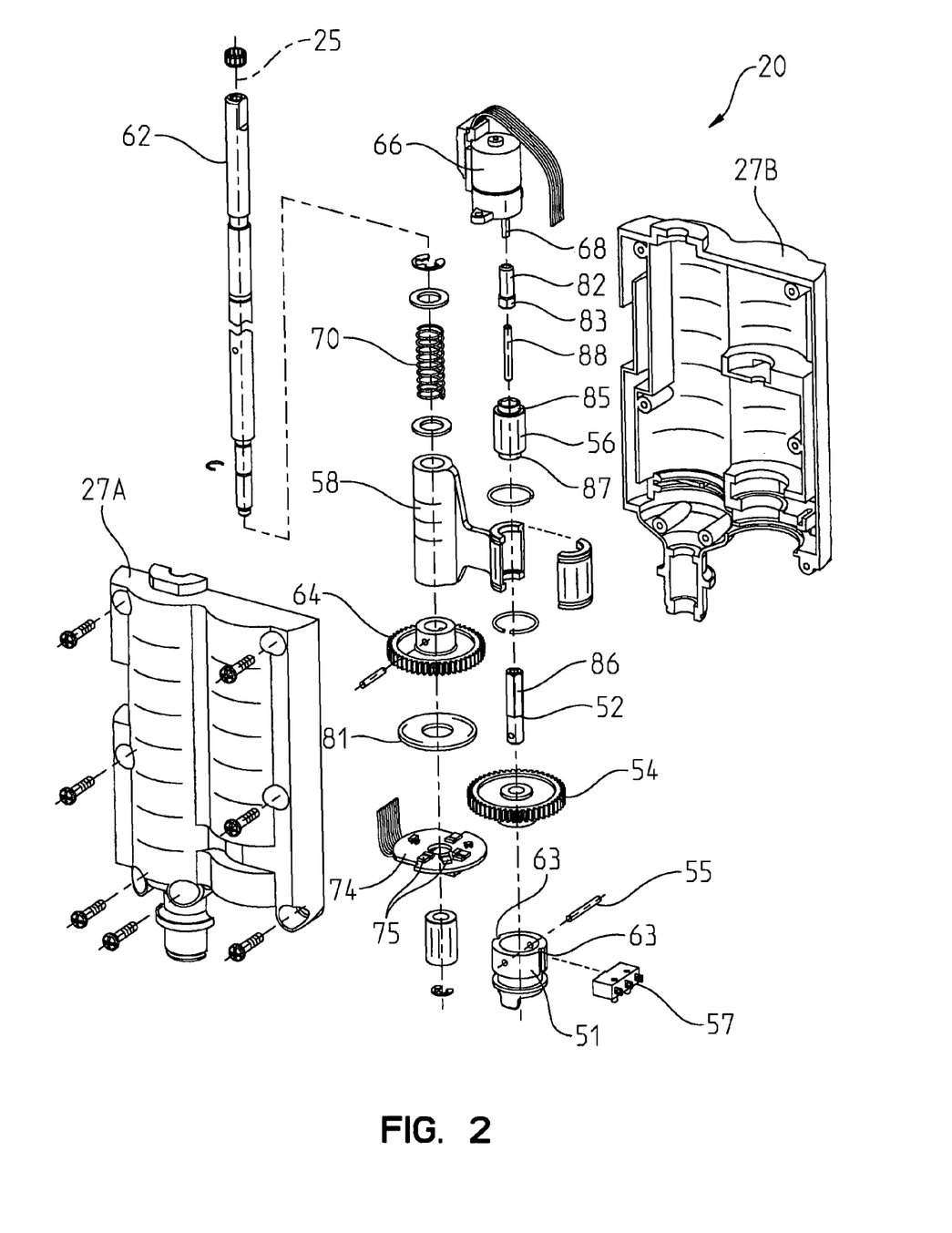
FIG. 2 is an exploded perspective view of an illustrative power module.
Figure 3:
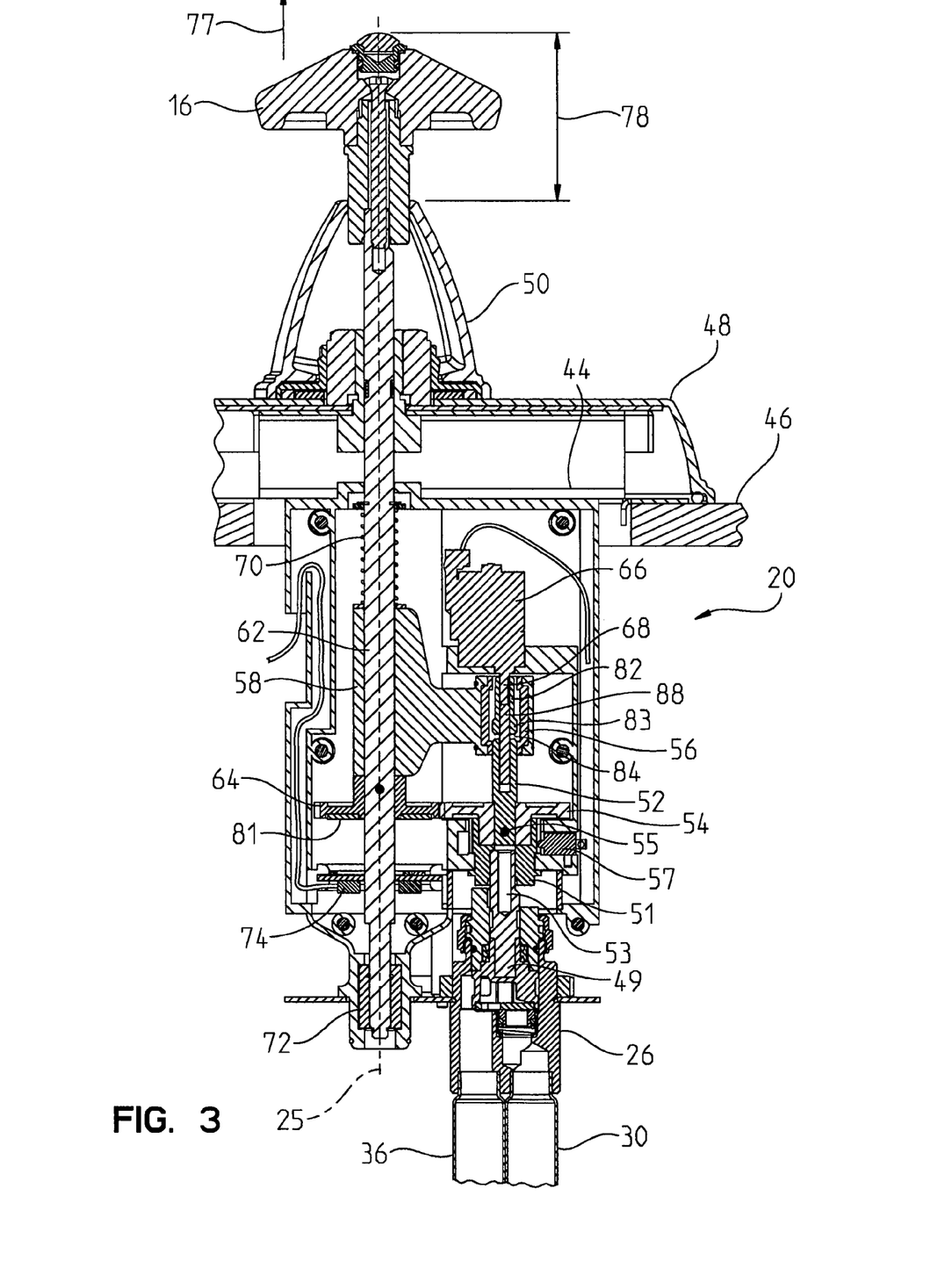
FIG. 3 is a cross-sectional view of an illustrative power module in a manual operation position.
Figure 4:
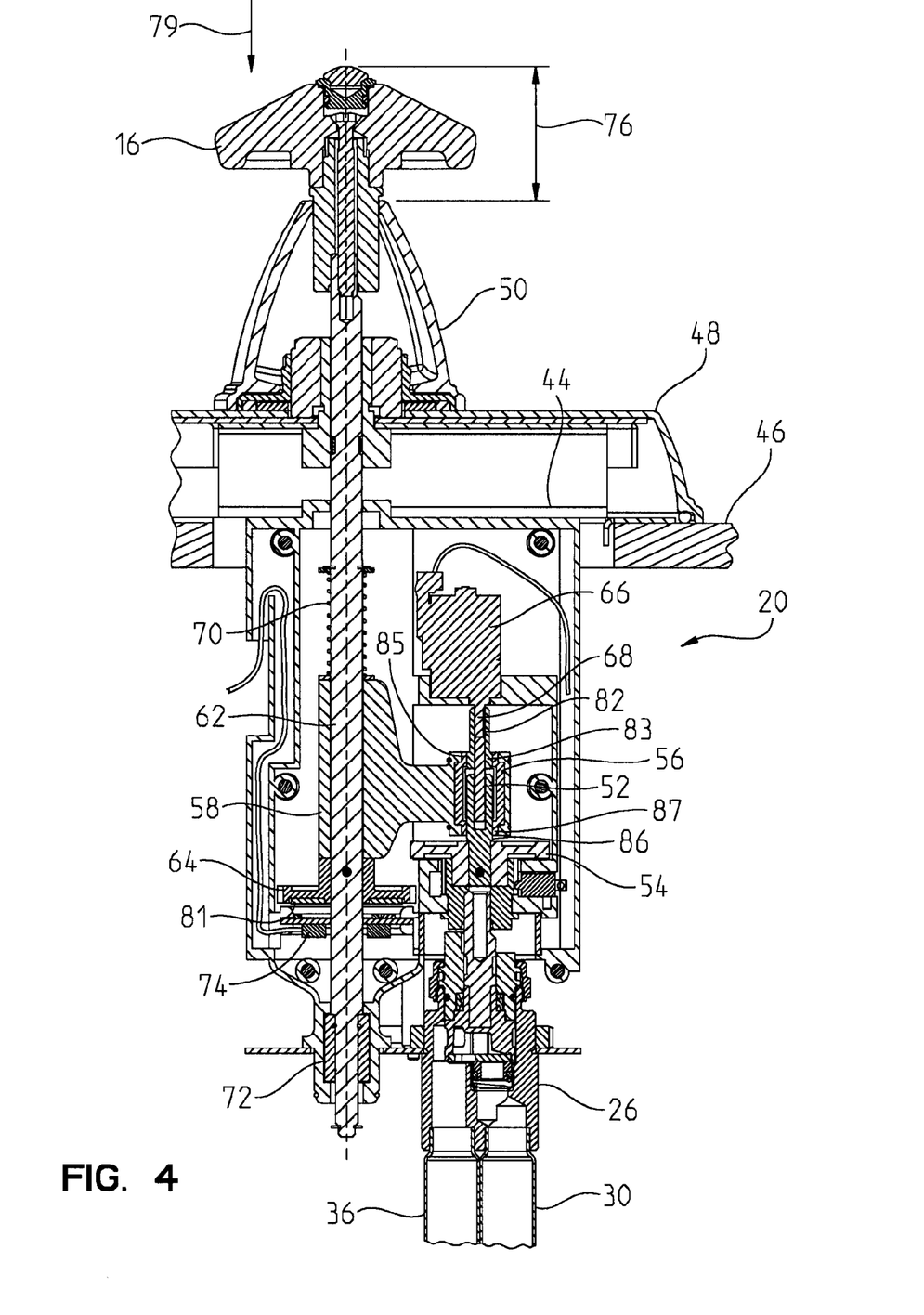
FIG. 4 is a cross-sectional view of the illustrative power module of FIG. 2 in an automatic operation position.

Referring to FIGS. 2-4, the operation and features of the illustrative first and second power modules 18 and 20 are described with reference to the second power module 20. As noted above, the second power module 20 is substantially identical to the first power module 18. The illustrative second power module 20 includes the second handle 16 attached to rotate a stem 62 about an axis 25. The stem 62 extends within front and rear housing portions 27A and 27B, and is supported for rotational movement within a drive coupling support member 58. The stem 62 supports a stem gear 64 which is rotatable about the axis 25 and is also movable axially with the stem 62 to selectively engage a first valve gear 54. More particularly, the stem gear 64 is engageable with the valve gear 54, which is operably coupled to a valve shaft 49 of the second fluid valve 26, when the stem 62 is moved axially upward or outward (in the direction of arrow 77) to the illustrated manual operation position 78 of FIG. 3. A valve coupler 51 receives an upper end 53 of the valve shaft 49, wherein the upper end 53 of the valve shaft 49 has a flat defining a "D" cross-section to prevent relative rotation between the valve shaft 49 and the valve coupler 51. A connecting shaft 52 is coupled to the valve coupler 51 and the valve gear 54 through a pin 55.

The connecting shaft 52 is operably coupled to a drive shaft coupler or second valve gear 56 that is engageable with a motor shaft 68 of the electric motor 66. The coupling support member 58 mounted to the stem 62 rotatably supports the drive shaft coupler 56. The coupling support member 58 moves with axial movement of the stem 62 to selectively engage the drive shaft coupler 56 with the motor shaft 68 such that the motor 66 can drive the fluid control valve 26 (FIG. 4).

The stem gear 64 (in the manual operation position) and the motor shaft 68 (in the automatic operation position) are alternatively engageable (i.e., manually coupled or electrically coupled) to drive the valve shaft 49 and provide control over actuation of the fluid control valve 26. An end of travel switch 57 is configured to provide a signal to the controller 44 when the valve 26 reaches a point of maximum rotation. Illustratively, the switch 57 comprises a snap switch configured to trigger off of grooves 63 formed in the outer surface of the valve coupler 51.

The stem 62 is held in the manual operation position 78 (illustratively, axial displacement of approximately 0.5 inches) by a detent assembly 72. The detent assembly 72 holds the stem 62 in the manual operation position 78 against the biasing force provided by a return spring 70. In the manual operation position, the stem gear 64 is coupled to the valve gear 54, and the motor shaft 68 is decoupled from the drive shaft coupler 56. More particularly, a drive member 82 is coupled to the motor shaft 68. The drive member 82 illustratively includes an engagement or hex portion 83 having a hexagonal cross-section, which is free to rotate within an inner chamber 84 of the drive shaft coupler 56. Rotation of the handle 16 and stem gear 64 is transmitted to rotation of the first valve gear 54 that, in turn, rotates the valve coupler 51 and the valve shaft 49 to control fluid flow. The control of fluid flow in the manual operation position 78 provides for the manual control of fluid flow and temperature by controlling the flow of fluid from the inlet 30 to the outlet 36.

When in the manual operation position 78, a magnetic encoder or switch 74 is disengaged such that the controller 44 does not operate the motors 66 of respective first or second power modules 18 or 20. More particularly, the magnetic encoder 74, illustratively including a plurality of Hall-effect sensors 75 (FIG. 2), are configured to detect a magnet 81 supported by the stem gear 64 only when the stem 62 is in the automatic operation position.

Referring to FIG. 4, the second power module 20 is shown in the automatic operation position 76. The handle 16 and the stem 62 are moved axially downward or inward (in the direction or arrow 79) such that in the automatic operation position 76, the stem gear 64 is disengaged from the first valve gear 54. The downward movement and position of the stem 62 includes a corresponding movement of the stem gear 64 such that the magnet 81 actuates the magnetic encoder 74. Actuation of the magnetic encoder 74 signals the controller 44 that the power module 20 is in the automatic operation position 76.

Downward axial movement of the stem 62 disengages the stem gear 64 from the valve gear 54, and concurrently moves the coupling support member 58 and the drive shaft coupler 56 into an engaged position. More particularly, the drive or hex portion 83 of the drive member 82 operably couples with a cooperating hex portion or lip 85 of the drive shaft coupler 56. The illustrative connecting shaft 52 and drive shaft coupler 56 include cooperating engagement portions 86 and 87, respectively, that provide for transmission of motor shaft rotation to the valve shaft 52 while at the same time providing for axial sliding movement of the drive shaft coupler 56 between coupled and decoupled positions. The engagement portions 86 and 87 may comprise of cooperating hex portions or splines.

An alignment pin 88 may extend between the connecting shaft 52 and the drive member 82 to facilitate axial alignment therebetween but without transmitting rotational movement. The return spring 70 provides a downward bias on the coupling support member 58 such that if the drive portion 83 of the drive member 82 and the lip 85 of the drive shaft coupler 56 are not aligned, initial rotation of the electric motor 66 relative to the drive shaft coupler 56 will operate to engage once in a proper position. Further, the return spring 70 maintains the stem 62 and the handle 16 in the automatic position 78 until the detent assembly 72 is engaged.

The magnetic encoder 74 mounted relative to the stem 62 generates a signal indicative of rotation of the stem 62 that is provided to the controller 44. More particularly, the encoder 74 provides an indication of the relative angular positions of the poles of the magnet 81 supported by the stem gear 64. While a single ring magnet 81 is illustrated in FIG. 2, it should be appreciated that multiple angularly spaced magnets could be substituted therefor. Detected rotation of the stem 62 is thereby translated into a corresponding rotation of the electric motors 66 within each of the power modules 18 and 20. The rotation of the electric motors 66 responsive to rotation of the stem 62 provides for actuation of the fluid control valves 24 and 26 to provide the desired fluid flow output necessary to accomplish the desired fluid flow and temperature from the spout 12.

In the absence of electric power to the faucet assembly 10, or in the event of motor failure, operation can be changed from automatic to manual. The first and second knobs 14 and 16 would be pulled axially upwardly, or away from the deck 46, to engage the corresponding detent assemblies 72. With the axial upward movement, the electric motor 66 is decoupled from the valve shaft 52 by disengaging the hex portion 83 of the drive member 82 from the drive shaft coupler 56. Further, the magnetic encoder or switch 74 is disengaged to signal manual operation to the controller 66 that, in turn, discontinues operation of the motors 66. The disengaged magnetic encoder or switch 74 provides for manual operation even with available electric power, if desired. The stem gear 64 is then coupled to the valve gear 54 and provides for manual actuation and adjustment of the first and second valves 24 and 26 (FIG. 1). Operation is thereby provided without power to the faucet assembly 10 or activation of the motors 66.

Figure 5:
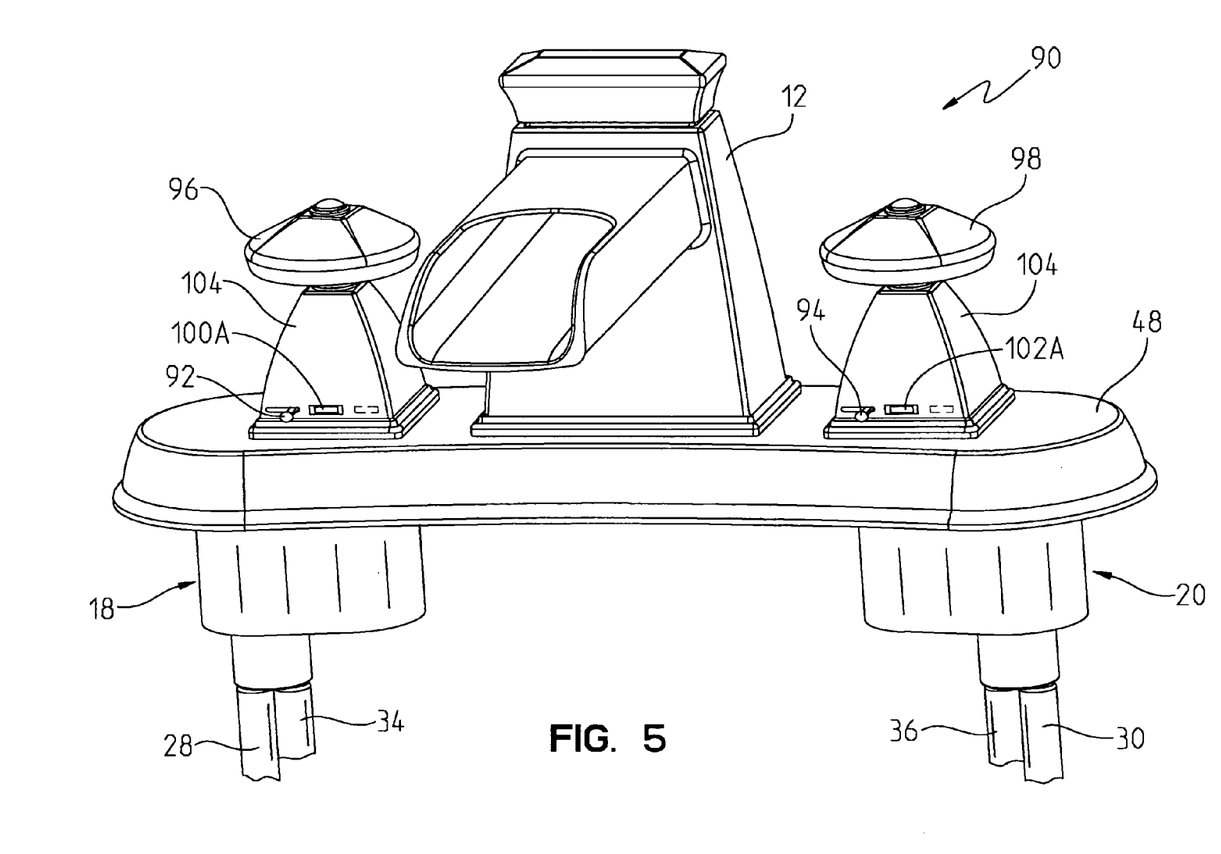
FIG. 5 is a perspective view of another illustrative faucet assembly including a display indicating operating position.
Figure 6:
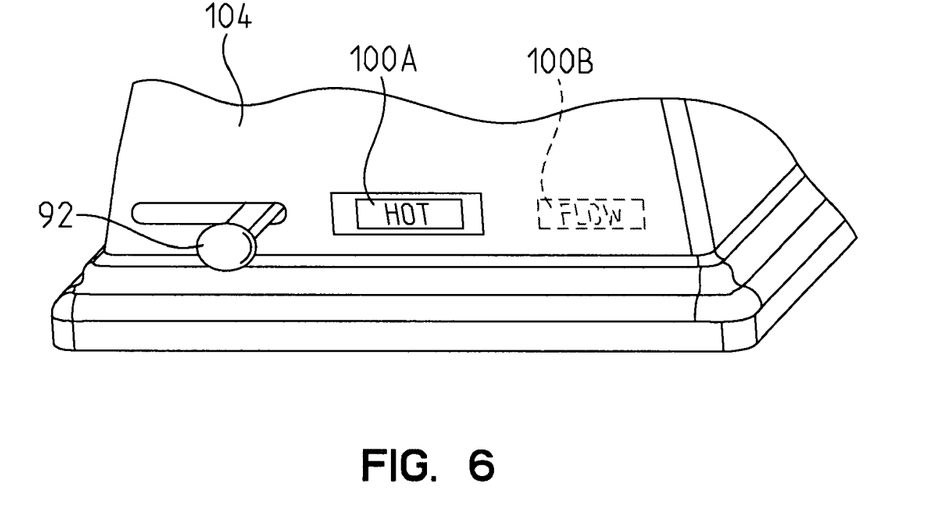
FIG. 6 is a detailed view of the first handle of FIG. 5.
Figure 7:
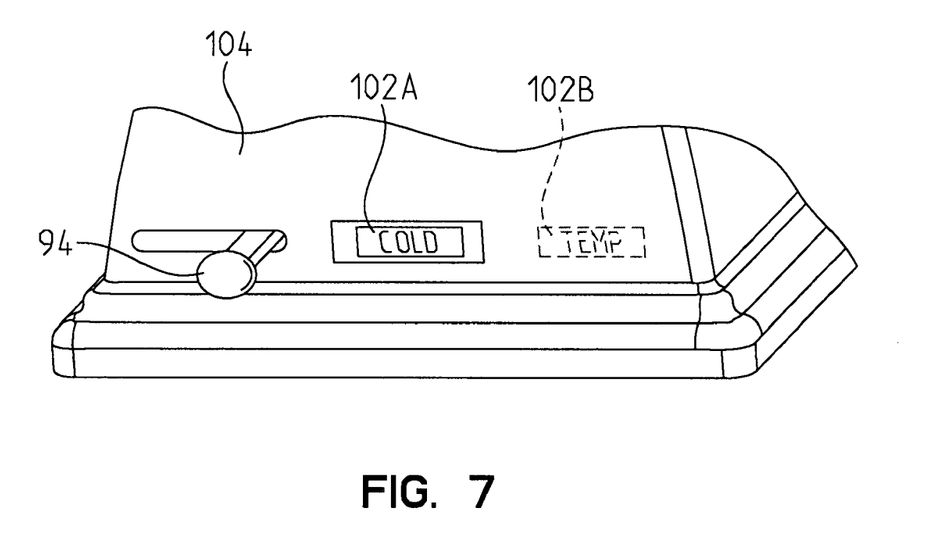
FIG. 7 is a detailed view of the second handle of FIG. 5.

Referring to FIGS. 5-7, another example faucet assembly 90 includes selection levers 92 and 94 disposed at a base of a first knob or handle 96 and a second knob or handle 98, respectively. Movement of the selection levers 92 and 94 moves the handle stem 62 axially between the automatic and mechanical positions 76 and 78 (FIGS. 3 and 4). Movement of the levers 92 and 94 provides for indication of an operating mode within first and second displays 100A and 102A supported by handle supports 104. The first and second displays 100A and 102A are shown in a manual operating position where the first and second handles 96 and 98 (FIG. 5) control hot and cold water flow (FIGS. 6 and 7). Selection of an automatic operating position would change the displays to indicate that the first handle 96 controls flow 100B, and that the second handle 98 controls temperature 102B. The first and second knobs 96 and 98 may illustratively be illuminated by way of a power source separate from the main power supply. In the illustrative faucet assembly 90, the displays 100A and 102A are illuminated in response to a power failure, thereby illuminating faucet knobs 96 and 98 to aid in the use and selection of the manual operation mode.

Figure 8:
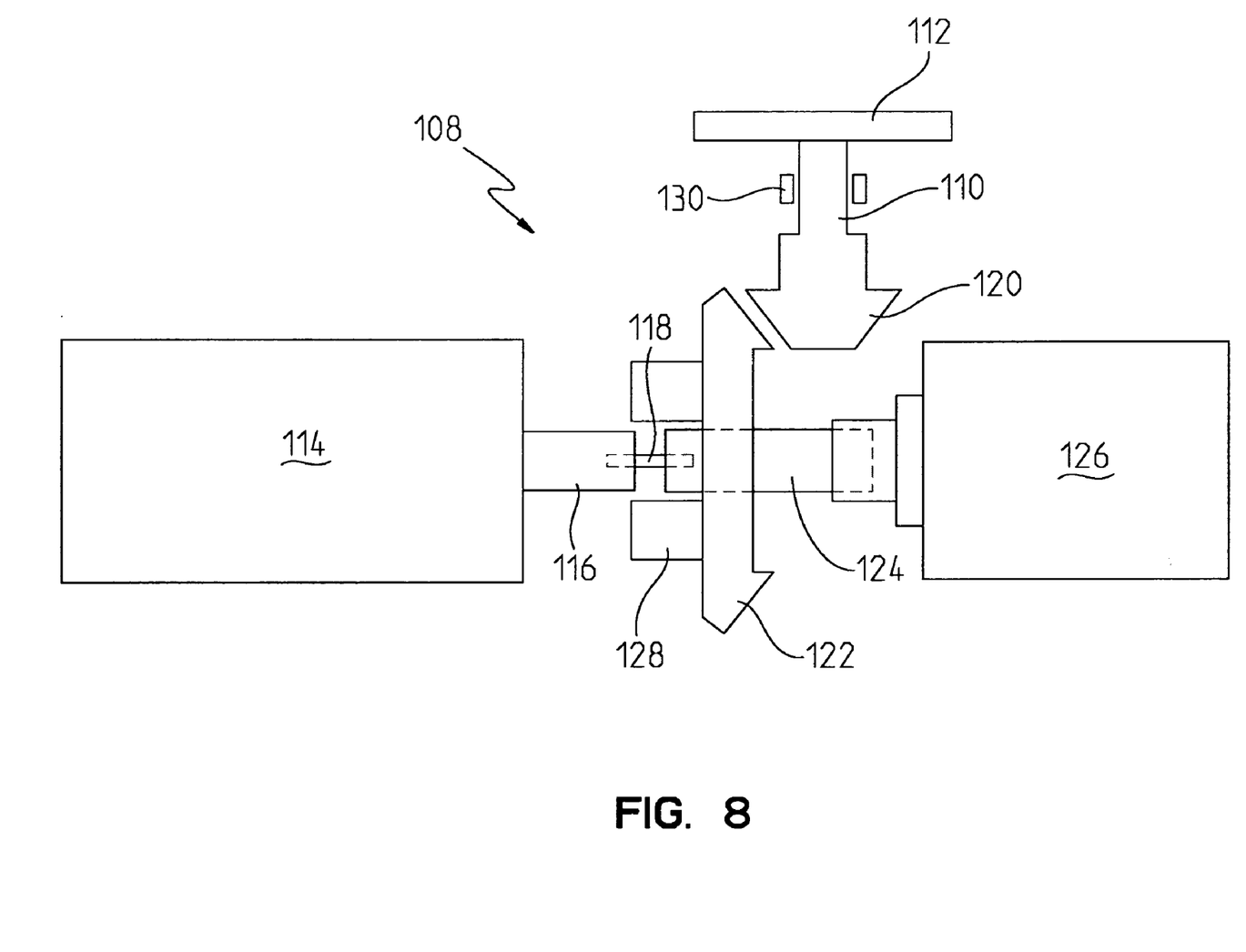
FIG. 8 is a cross-sectional view of another illustrative control module for switching between automatic and manual operation.

Referring to FIG. 8, another illustrative faucet assembly 108 includes a handle stem 110 that extends from a handle 112. A bevel gear 120 is mounted at the end of the handle stem 110. In manual mode, a manual gear 122 is moved axially to engage the bevel gear 120. The manual gear 120 includes a collar 128 that includes splines to transfer rotational movement to the valve shaft 124 while still providing for axial movement of the manual gear 120. Axial movement of the collar 128 causes a decoupling of the collar 128 with the motor shaft 116. The motor shaft includes corresponding splines that engage the splines of the collar 128. An alignment pin 118 may be provided between the motor shaft 116 and the valve shaft 124 to facilitate alignment therebetween.

An automatic mode is provided by moving the manual gear 122 out of engagement with the bevel gear 120. The axial movement of the manual gear 122 causes the collar 128 to span a gap between the motor shaft 116 and the valve shaft 122. This coupling of the motor shaft 116 to the valve shaft 124 provides for the transmission of rotational movement of the motor 114 to the valve 126. The collar 128 can only couple the motor shaft 116 with the valve shaft 124 when the manual gear 120 is spaced apart from the bevel gear 120.

Rotation of the handle stem 110 is sensed by magnetic encoders 130 to provide the desired input utilized to control the electric motor 114, and thereby the valve 126.

Although an illustrative embodiment of this invention has been disclosed, a worker of ordinary skill in this art would recognize that certain modifications would come within the scope of this invention. For that reason, the following claims should be studied to determine the true scope and content of this invention.

The invention claimed is:

1. A faucet assembly comprising:
  a first fluid control valve configured to control fluid flow from a first inlet;
  a first manual control including a first control member, the first manual control being selectively operably coupled to the first fluid control valve;
  a first drive motor selectively operably coupled to the first fluid control valve;
  a second fluid control valve configured to control fluid flow from a second inlet;
  a second manual control including a second control member, the second manual control being selectively operably coupled to the second fluid control valve;
  a second drive motor selectively operably coupled to the second fluid control valve;
  each of the first fluid control valve and the second fluid control valve being actuatable through one of a first coupling connectable to the corresponding one of the first and second manual controls in a manual mode of operation and a second coupling connectable to the corresponding one of the first and second drive motors in an automatic mode of operation; and
  a controller in communication with the first and the second drive motors, the controller in the automatic mode of operation causing the first and second drive motors to cooperate in controlling a fluid flow rate in response to input from the first control member, and to cooperate in controlling a fluid temperature in response to input from the second control member.

2. The assembly as recited in claim 1, wherein the first and second control valves each includes a first valve gear mounted to a valve shaft rotatable for controlling fluid flow, wherein the first coupling comprises the first valve gear engaged to a stem gear fixed to a stem rotatable by a corresponding one of a first control member and a second control member.

3. The assembly as recited in claim 2, wherein the stem is movable between a manual control position where the stem gear is engaged to the valve gear, and an automatic control position where the stem gear is not engaged to the valve gear.

4. The assembly as recited in claim 3, wherein the stem is movable axially between the manual control position and the automatic control position.

5. The assembly as recited in claim 2, wherein when the first fluid control valve and the second fluid control valve are connected by the second coupling, actuation of the first control member controls a fluid flow rate, and actuation of the second control member controls fluid temperature.

6. The assembly as recited in claim 3, wherein the second coupling comprises a second valve gear mounted to the valve shaft that is selectively connectable to a drive shaft of the corresponding one of the first drive motor and the second drive motor.

7. The assembly as recited in claim 6, including a drive coupling support member mounted to the stem and movable with the stem, the drive coupling support member supporting the second coupling between the drive shaft and the valve shaft.

8. The assembly as recited in claim 7, wherein the second coupling comprises a coupling member that couples the drive shaft to the valve shaft when the stem is in the automatic control position.

9. The assembly as recited in claim 1, wherein the controller controls the first drive motor and the second drive motor to selectively open the corresponding first fluid control valve and the second fluid control valve to independently control fluid flow rate and fluid temperature.

10. The assembly as recited in claim 9, including a rotation sensor for providing a signal to the controller indicative of rotation of the stem, wherein the rotation signal is indicative of a desired setting of one of the first fluid control valve and the second fluid control valve.

11. A faucet assembly comprising:
a first valve member configured to control fluid flow from a first inlet, the first valve member selectively controllable manually by a first control handle and automatically by a first drive motor; and
a second valve member configured to control fluid flow from a second inlet, the second valve member controllable manually by a second control handle and automatically by a second drive motor, wherein in a manually coupled condition, the first control handle controls actuation of the first valve member, and the second control handle controls actuation of the second valve member, and in an electrically coupled position the first control handle provides an input utilized to control both the first and second drive motors to provide a desired fluid flow output, and the second control handle provides an input utilized to control both the first and second drive motors to provide a desired fluid temperature output.

12. The assembly as recited in claim 11, wherein each of the first and second control handles are mounted to a stem that is rotatable about an axis to actuate a corresponding one of the first valve member and the second valve member.

13. The assembly as recited in claim 12, wherein each of the first valve member and the second valve member include a first valve gear engageable to a stem gear mounted to the stem and a drive gear for linking the first and second drive motors to a corresponding one of the first and second valve members.

14. The assembly as recited in claim 13, including a coupling support member supported on the stem for supporting the drive gear.

15. The assembly as recited in claim 14, wherein the stem is movable axially to selectively engage the stem gear to the valve gear to provide the manually coupled position with the corresponding first and second control handles and the electrically coupled position with the first and second drive motors.

16. The assembly as recited in claim 1, wherein the first inlet is a hot water inlet and the second inlet is a cold water inlet.

17. The assembly as recited in claim 11, wherein the first inlet is a hot water inlet and the second inlet is a cold water inlet.

* * * * *

UNITED STATES PATENT AND TRADEMARK OFFICE
CERTIFICATE OF CORRECTION

PATENT NO.       : 7,624,757 B2                              Page 1 of 1
APPLICATION NO.  : 11/558188
DATED            : December 1, 2009
INVENTOR(S)      : Randall Paul Schmitt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-sixth Day of October, 2010

David J. Kappos
*Director of the United States Patent and Trademark Office*